Patented Nov. 1, 1938

2,135,054

UNITED STATES PATENT OFFICE 2,135,054

TREATMENT OF MILK AND MILK PREPARATIONS

Charles Schwartz, Pittsburgh, Pa., assignor to Hall Laboratories, Inc., Pittsburgh, Pa., a corporation of Pennsylvania No Drawing. Application June 17, 1937, Serial No. 148,749

9 Claims. (Cl. 99—54)

This invention relates to the treatment of milk and milk preparations, and more particularly to the treatment of milk and milk preparations to improve their digestibility. It is an improvement upon the invention disclosed in Hall Patent No. 2,064,110, granted December 15, 1936.

According to the preferred procedure disclosed in said Hall patent, the digestibility of milk and milk preparations is improved by the addition thereto of sodium metaphosphate. The effect of sodium metaphosphate is to reduce the concentration of calcium ion in the milk, which is responsible for curd formation. This is shown by the fact that if the calcium ion is reduced below a certain point, the milk will not coagulate. By controlling the amount of sodium metaphosphate added to the milk, the degree of crudling can be controlled or even entirely eliminated, thus improving the digestibility of the milk.

I have found that the alkali-metal tripolyphosphates, and particularly sodium tripolyphosphate, may be used in place of the sodium metaphosphate in the treatment of milk or milk preparations according to said Hall patent. The alkali-metal tripolyphosphates, while accomplishing the same purposes as the alkali-metal metaphosphates, have certain distinct advantages which will be pointed out more fully hereinafter. The alkali-metal tripolyphosphates are chemical compounds of the formula $M_5P_3O_{10}$ in their anhydrous form. Sodium tripolyphosphate is the most common and important of the alkali-metal tripolyphosphates. Chemical and X-ray analyses show that sodium tripolyphosphate is a definite chemical compound which is distinct from both sodium metaphosphate and sodium pyrophosphate and that it is not a mixture of the two. Sodium tripolyphosphate is fusible and may be solidified by very rapidly cooling in a glassy amorphous form. Under slower cooling it solidifies in the form of crystals. The glass may be converted into crystal form by annealing. Sodium tripolyphosphate forms a crystalline hydrate of the general formula $Na_5P_3O_{10}.6H_2O$. Sodium tripolyphosphate is colorless, appearing white in the granulated crystalline form. When crushed it forms a free-flowing granular mass. By suitable precautions it may be produced in a mass which readily disintegrates into its constituent fine crystals. Sodium tripolyphosphate is not deliquescent and particularly in its hydrated form may be preserved indefinitely in ordinary atmospheres without caking or picking up moisture. Sodium tripolyphosphate is readily water-soluble in both its glassy and crystalline forms.

The action of the sodium tripolyphosphate is not to remove the calcium from the milk, but is rather to convert it into a slightly ionized water-soluble sodium-calcium tripolyphosphate complex. This sodium-calcium tripolyphosphate complex is gradually hydrolyzed after absorption in the body, thus releasing the calcium and orthophosphate. The coagulation of the milk is thus controlled without robbing the milk of the calcium.

Sodium tripolyphosphate has a number of advantages over sodium hexametaphosphate in the treatment of milk. Sodium hexametaphosphate has a tendency to hydrolyze or revert to sodium orthophosphate when in contact with mosture. This tendency to revert to the orthophosphate is increased when the metaphosphate is heated. Thus, where sodium hexametaphosphate is employed in a milk preparation and the preparation is allowed to stand for some time, or particularly where the preparation is heated, such as is the case in the production of condensed or evaporated milk, the sodium hexametaphosphate has a considerable tendency to be converted into sodium orthophosphate. The sodium orthophosphate does not have the property of reducing the concentration of calcium ion in the milk as does sodium metaphosphate. For this reason, in the preparation of cencentrated milk in accordance with said Hall patent, the milk is first concentrated and then the sodium hexametaphosphate is added thereto. Sodium tripolyphate is considerably more stable than sodium hexametaphosphate and accordingly its use will maintain the reduced concentration of calcium ion in the milk for a much longer period of time than does sodium hexametaphosphate. Sodium tripolyphosphate is sufficiently stable to permit the addition of it to the milk prior to concentrating the milk, and hence sodium tripolyphosphate may be used for preparing an easily digestible concentrated milk.

A further advantage of the sodium tripolyphosphate as compared with sodium hexametaphosphate is that the tripolyphosphate is not hygroscopic, as is sodium hexametaphosphate. Also, it can be readily prepared in crystalline form without the drastic chilling which is required in producing glassy sodium hexametaphosphate. Sodium tripolyphosphate can therefore be readily prepared as a free-flowing material which will not become moist upon standing in ordinary atmospheres, as does the metaphosphate. Sodium tripolyphosphate may be used not only in improving the digestibility of raw or pasteurized milk, but also in the preparation of concentrated milk such as evaporated milk or powdered milk or other milk preparations. All of these tend in the stomach to form curds, which curd formation can be controlled or even eliminated by the reduction of the ionic calcium in the milk. Although in the preparation of concentrated milk the tripolyphosphate may be added to the milk before the milk is concentrated, it is preferable in those cases where the milk is subjected to high temperatures for long periods of time to first concentrate the milk and then add the tripolyphosphate.

In case it is desired to increase the calcium content of the milk or milk preparation, the soluble calcium alkali-metal tripolyphosphate may be added such as may be produced by adding calcium salt to a sodium tripolyphosphate solution, or else by adding directly to the milk the desired amount of calcium salt and an amount of sodium tripolyphosphate sufficient to take care of the additional calcium. Accordingly, in the claims the expression "adding thereto a calcium salt and an alkali-metal tripolyphosphate" is intended to include the addition of either the soluble calcium alkali-metal tripolyphosphate complex or the calcium salt and the alkali-metal tripolyphosphate separately to the milk.

The term "milk preparation" as used in the claims is intended to include either milk alone or a preparation containing milk and other materials such, for example, as those added to milk to form infant food.

The invention is applicable to the treatment of milk preparations such as infant food containing milk or to the treatment of milk containing food for use by those having delicate digestive systems.

While I prefer to use sodium tripolyphosphate, the water-soluble tripolyphosphates of the other alkali-metals such as those of potassium, ammonium and lithium may be employed.

The invention is not limited to the preferred materials or process, but may be otherwise embodied or practiced within the scope of the following claims.

I claim:

1. The process of improving the digestibility of milk and milk preparations, which comprises adding thereto an alkali-metal tripolyphosphate.

2. The process of improving the digestibility of milk and milk preparations, which comprises adding thereto sodium tripolyphosphate.

3. The process of improving the digestibility of milk and milk preparations and increasing their soluble calcium content, which comprises adding thereto a calcium salt and an alkali-metal tripolyphosphate.

4. The process of improving the digestibility of milk and milk preparations, which comprises concentrating the milk, and thereafter adding an alkali-metal tripolyphosphate.

5. The process of improving the digestibility of milk and milk preparations and increasing their soluble calcium content, which comprises concentrating the milk, and thereafter adding thereto a calcium salt and an alkali-metal tripolyphosphate.

6. A milk preparation containing an alkali-metal tripolyphosphate.

7. A milk preparation containing sodium tripolyphosphate.

8. A preparation containing concentrated milk and an alkali-metal tripolyphosphate.

9. A milk preparation containing in addition to the calcium originally present in the milk a calcium salt and an alkali-metal tripolyphosphate.

CHARLES SCHWARTZ.

---

CERTIFICATE OF CORRECTION.

Patent No. 2,135,054.   November 1, 1938.

CHARLES SCHWARTZ.

It is hereby certified that error appears in the printed specification of the above numbered patent requiring correction as follows: Page 1, first column, line 17, for "crudling" read curdling; same page, second column, line 17, for "mosture" read moisture; line 31, for "cencentrated" read concentrated; and line 34, for "tripolyphate" read tripolyphosphate; and that the said Letters Patent should be read with this correction therein that the same may conform to the record of the case in the Patent Office.

Signed and sealed this 6th day of December, A. D. 1938.

Henry Van Arsdale (Seal)   Acting Commissioner of Patents.

phosphate. Sodium tripolyphosphate may be used not only in improving the digestibility of raw or pasteurized milk, but also in the preparation of concentrated milk such as evaporated milk or powdered milk or other milk preparations. All of these tend in the stomach to form curds, which curd formation can be controlled or even eliminated by the reduction of the ionic calcium in the milk. Although in the preparation of concentrated milk the tripolyphosphate may be added to the milk before the milk is concentrated, it is preferable in those cases where the milk is subjected to high temperatures for long periods of time to first concentrate the milk and then add the tripolyphosphate.

In case it is desired to increase the calcium content of the milk or milk preparation, the soluble calcium alkali-metal tripolyphosphate may be added such as may be produced by adding calcium salt to a sodium tripolyphosphate solution, or else by adding directly to the milk the desired amount of calcium salt and an amount of sodium tripolyphosphate sufficient to take care of the additional calcium. Accordingly, in the claims the expression "adding thereto a calcium salt and an alkali-metal tripolyphosphate" is intended to include the addition of either the soluble calcium alkali-metal tripolyphosphate complex or the calcium salt and the alkali-metal tripolyphosphate separately to the milk.

The term "milk preparation" as used in the claims is intended to include either milk alone or a preparation containing milk and other materials such, for example, as those added to milk to form infant food.

The invention is applicable to the treatment of milk preparations such as infant food containing milk or to the treatment of milk containing food for use by those having delicate digestive systems.

While I prefer to use sodium tripolyphosphate, the water-soluble tripolyphosphates of the other alkali-metals such as those of potassium, ammonium and lithium may be employed.

The invention is not limited to the preferred materials or process, but may be otherwise embodied or practiced within the scope of the following claims.

I claim:

1. The process of improving the digestibility of milk and milk preparations, which comprises adding thereto an alkali-metal tripolyphosphate.

2. The process of improving the digestibility of milk and milk preparations, which comprises adding thereto sodium tripolyphosphate.

3. The process of improving the digestibility of milk and milk preparations and increasing their soluble calcium content, which comprises adding thereto a calcium salt and an alkali-metal tripolyphosphate.

4. The process of improving the digestibility of milk and milk preparations, which comprises concentrating the milk, and thereafter adding an alkali-metal tripolyphosphate.

5. The process of improving the digestibility of milk and milk preparations and increasing their soluble calcium content, which comprises concentrating the milk, and thereafter adding thereto a calcium salt and an alkali-metal tripolyphosphate.

6. A milk preparation containing an alkali-metal tripolyphosphate.

7. A milk preparation containing sodium tripolyphosphate.

8. A preparation containing concentrated milk and an alkali-metal tripolyphosphate.

9. A milk preparation containing in addition to the calcium originally present in the milk a calcium salt and an alkali-metal tripolyphosphate.

CHARLES SCHWARTZ.

---

CERTIFICATE OF CORRECTION.

Patent No. 2,135,054.   November 1, 1938.

CHARLES SCHWARTZ.

It is hereby certified that error appears in the printed specification of the above numbered patent requiring correction as follows: Page 1, first column, line 17, for "crudling" read curdling; same page, second column, line 17, for "mosture" read moisture; line 31, for "cencentrated" read concentrated; and line 34, for "tripolyphate" read tripolyphosphate; and that the said Letters Patent should be read with this correction therein that the same may conform to the record of the case in the Patent Office.

Signed and sealed this 6th day of December, A. D. 1938.

Henry Van Arsdale (Seal)   Acting Commissioner of Patents.